Patented Jan. 31, 1928.

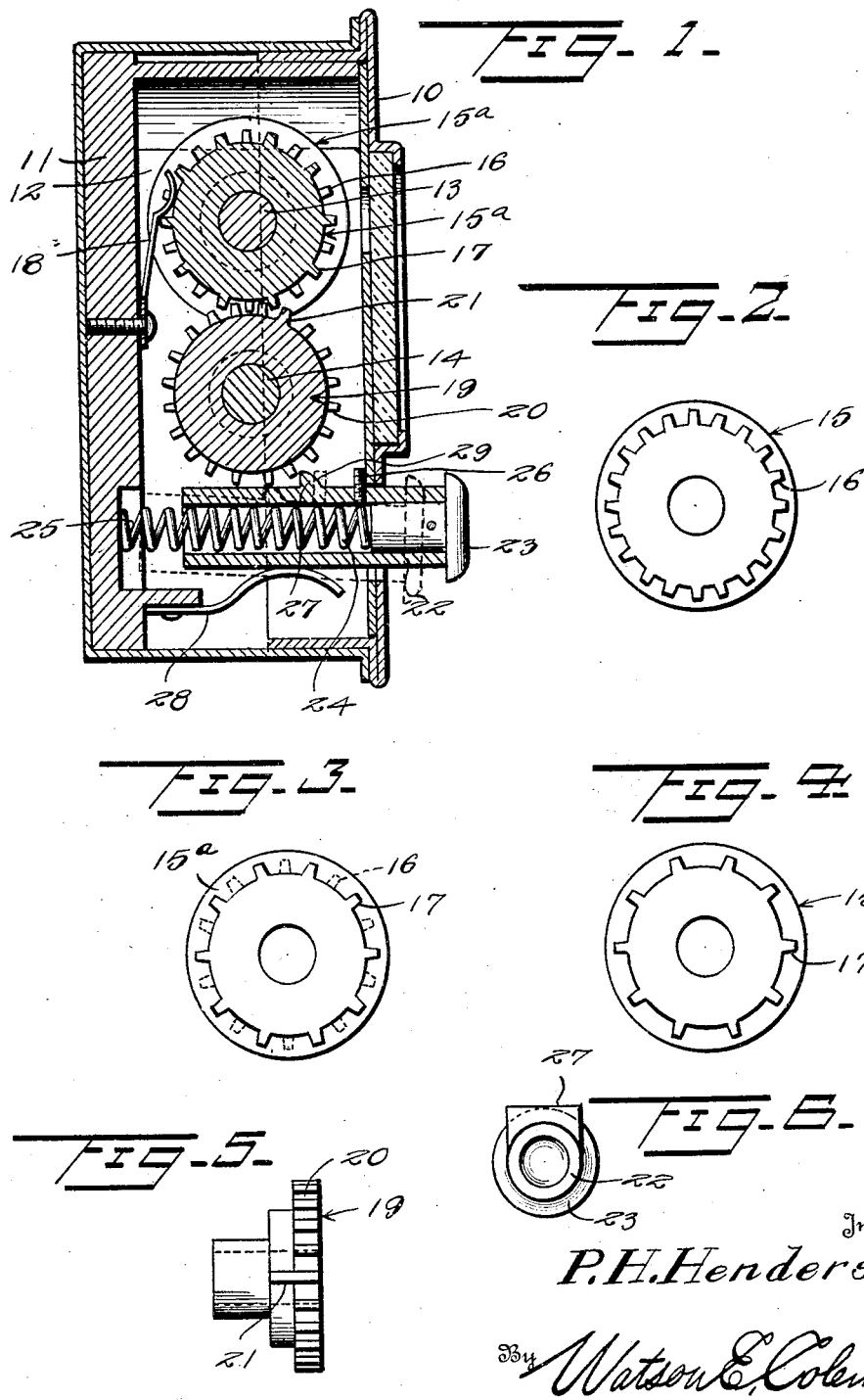

1,657,828

UNITED STATES PATENT OFFICE.

PRUETT H. HENDERSON, OF DENVER, COLORADO.

EXPENSE REGISTER ACTUATOR.

Application filed December 9, 1926. Serial No. 153,667.

This invention relates to an actuating device adapted to be used in conjunction with an expense register and more particularly to a device of this character for use with automobiles for totaling the expense incurred in the operation of the machine over a given period.

An important object of the invention is to produce a device of this character which may be very readily and cheaply manufactured and which may be constructed, so that it is very small in size.

A further object of the invention is to produce a novel and improved actuating mechanism for the register, whereby the cost of production is materially reduced without affecting the efficiency thereof.

These and other objects I attain by the construction shown in the accompanying drawings, wherein for the purpose of illustration is shown a preferred embodiment of my invention and wherein:—

Figure 1 is a transverse sectional view of a register showing the actuator applied thereto and with parts thereof in section;

Figure 2 is a side elevational view of a terminal number wheel used in the register;

Figure 3 is a similar view of an intermediate number wheel used in the register;

Figure 4 is a similar view of the wheel shown in Figure 3 and viewing the same at the opposite side thereof from that shown in Figure 3;

Figure 5 is an edge elevational view of a transmission gear wheel used in the register;

Figure 6 is an end elevational view of a plunger used in the actuating mechanism.

Referring now more particularly to the drawings, the numeral 10 generally designates an outer casing which may be of any suitable character, but is preferably of such size and shape as to permit its application to the dash board of the vehicle with which it is to be employed without marring the appearance of the same or interfering with the placement of other instruments. Within this casing is arranged a main frame 11 including opposed end supports 12 within which are mounted upper and lower shafts 13 and 14. Upon the shaft 13 are arranged number wheels 15, 15$^a$ and 15$^b$. Each number wheel 15, 15$^a$ has at the left-hand side thereof a twenty tooth gear 16. Each number wheel 15$^a$, 15$^b$ has upon its right-hand side a ten tooth gear 17. The number wheel 15 which is arranged at the extreme right-hand side of the shaft and forms the units wheel is not provided with the gear 17 which, as will hereinafter appear, forms a portion of the transfer mechanism and the number wheel 15$^b$ which is arranged at the left-hand side of the shaft is provided with no gear 16, as these gears are employed for actuation of the number wheels. A gear of each number wheel is engaged by a spring 18 to maintain the number wheel in its adjusted position and offer considerable resistance to the rotation thereof.

Upon the shaft 14 are mounted transmission and transfer gears 19, each comprising a body having upon its periphery at one side thereof a twenty tooth gear 20 and at the opposite side thereof a single tooth 21. These gears are so positioned upon the shaft 14 that the twenty tooth gear thereof meshes with the twenty tooth gear 16 of one of the associated number wheels and the single tooth 21 thereof is positioned to engage the ten tooth gear 17 of the next of the associated numeral wheels. It will be obvious that for each complete rotation of the gear 19, one of the associated number wheels will be rotated through a complete cycle, while the other of the associated number wheels will be advanced one step. It will also be obvious that the gear 19 constitutes a carrying mechanism, for the reason that if the lower in value of the number wheels associated therewith completes a rotation, this gear will transmit its operation to the next higher number wheel, advancing the same one step.

The actuating mechanism comprises tubular plungers 22 operating beneath each unit 19. These operating plungers have inserted in the outer ends thereof heads 23 for engagement by a finger of the operator's hand and the inner ends of these heads provide seats for the outer ends of coil springs 24 which are maintained in proper alignment by the tubular plungers and which seat at their opposite ends against the main frame 25. Each plunger has upon its periphery a stop shoulder 26 engaging a fixed portion of the casing or frame to limit outward movement of the plunger and is further provided with a transversely extending rib 27 upon that face thereof opposing the associated gear 19. The upper surface of this rib is flat, so that the gear will serve to resist any tendency of the plunger to rotate. The mounting of the plungers in the casing is sufficiently loose to permit vertical oscillation thereof and the main frame 11 has secured thereto springs 28 engaging each plunger and urging the same into engagement with the associated gear unit 19. The springs 28 are of such size that the plungers 22 may be forced outwardly by the springs 25 against the resistance thereof resulting from the necessary downward movement of the plungers to enable the ribs 27 to clear the teeth of the associated gear unit 19. Thus, the use of a pivoted pawl for actuation of the gear units 19 is eliminated, enabling the production of the actuating mechanism at a very low manufacturing cost. At each operation of the plunger, as the plunger is released, the inner end of the plunger will swing downwardly, permitting the rib 27 to pass beneath the teeth of the associated gear unit 19. To assist in this actuation of the plunger, the forward face of this rib is preferably provided with a cam face 29.

I claim:—

A device of the character described consisting of a casing provided at its side with a plunger opening, a gear wheel journaled in the casing upon an axis disposed transversely of said opening, a tubular plunger passing through the opening and having a stop member adapted to engage the inner surface of the side wall of the casing, said opening being of greater diameter than said plunger, a spring carried by the plunger and bearing against the wall of the casing which lies opposite the opening, a spring located in the casing and bearing against the plunger to hold the same toward the gear wheel and said plunger having a transversely disposed rib adapted to engage a tooth of the gear wheel.

In testimony whereof I hereunto affix my signature.

PRUETT H. HENDERSON.